United States Patent
Weiss et al.

(10) Patent No.: US 9,937,886 B2
(45) Date of Patent: Apr. 10, 2018

(54) RECEIVER CONFIGURATION FOR A CONTROL UNIT IN A VEHICLE AND METHOD FOR GENERATING A SYNCHRONIZATION PULSE

(71) Applicant: Robert Bosch GmbH, Stuttgart (DE)

(72) Inventors: Timo Weiss, Hemmingen (DE);
Matthias Siemss, Gomaringen (DE);
Guenter Weiss, Walheim (DE);
Massoud Momeni, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 601 days.

(21) Appl. No.: 14/376,328

(22) PCT Filed: Jan. 17, 2013

(86) PCT No.: PCT/EP2013/050828
§ 371 (c)(1),
(2) Date: Aug. 1, 2014

(87) PCT Pub. No.: WO2013/113570
PCT Pub. Date: Aug. 8, 2013

(65) Prior Publication Data
US 2015/0151701 A1    Jun. 4, 2015

(30) Foreign Application Priority Data
Feb. 3, 2012 (DE) ..................... 10 2012 201 596

(51) Int. Cl.
*B60R 21/01* (2006.01)
*H04L 7/04* (2006.01)
*H04L 12/40* (2006.01)

(52) U.S. Cl.
CPC ............. *B60R 21/01* (2013.01); *H04L 7/04* (2013.01); *H04L 12/40006* (2013.01); *H04L 2007/047* (2013.01); *H04L 2012/40273* (2013.01)

(58) Field of Classification Search
CPC ....... B60R 21/01; B60R 16/03; B60R 16/023; H04L 7/04; H04L 12/40006;
(Continued)

(56) References Cited

U.S. PATENT DOCUMENTS

| | | | |
|---|---|---|---|
| 5,408,497 | A | 4/1995 | Baumann et al. |
| 6,484,223 | B1 | 11/2002 | Lenz |

(Continued)

FOREIGN PATENT DOCUMENTS

| | | |
|---|---|---|
| DE | 10 2009 001 370 | 9/2010 |
| EP | 0 959 595 | 11/1999 |
| JP | 2007008359 A | 1/2007 |

OTHER PUBLICATIONS

International Search Report, PCT International Application No. PCT/EP2013/050828, dated Apr. 25, 2013.

*Primary Examiner* — Jaren Fureman
*Assistant Examiner* — Rafael Pacheco
(74) *Attorney, Agent, or Firm* — Norton Rose Fulbright US LLP; Gerard Messina

(57) ABSTRACT

A receiver configuration for a control unit in a vehicle having a voltage generator for generating a synchronization pulse, which includes a first voltage source, a current source and a current sink, the voltage generator generating the synchronization pulse within predefined specification limits having a predefined shape and a predefined time behavior, and the receiver configuration outputting the synchronization pulse for synchronizing a signal transmission via a databus to at least one sensor. A method is also provided for generating a synchronization pulse. The voltage generator (Continued)

generates the synchronization pulse via the current source and the current sink by charging and/or discharging a bus load essentially as a sinusoidal oscillation.

13 Claims, 4 Drawing Sheets

(58) Field of Classification Search
CPC ..... H04L 2007/047; H04L 2012/40273; H04L 7/0091; H04L 7/0079; H03K 4/02; H03K 4/92; H04B 3/54
See application file for complete search history.

(56) References Cited

U.S. PATENT DOCUMENTS

| | | |
|---|---|---|
| 2003/0001618 A1 | 1/2003 | Haycock et al. |
| 2007/0115103 A1* | 5/2007 | Boran .................... B60R 21/01 340/436 |

* cited by examiner

RECEIVER CONFIGURATION FOR A CONTROL UNIT IN A VEHICLE AND METHOD FOR GENERATING A SYNCHRONIZATION PULSE

FIELD

The present invention relates to a receiver configuration for a control unit in a vehicle and a corresponding method for generating a synchronization pulse.

BACKGROUND INFORMATION

For transmitting sensor data to a central control unit (ECU) in a vehicle, peripheral sensors for occupant protection systems generally use current interfaces (e.g., PAS4, PSI5). In current interfaces of the latest generation (PSI5), bus operation, including multiple sensors on one receiver, is made possible with the aid of synchronization. A working clock pulse in the form of a voltage pulse is generated by the central control unit (ECU) for the synchronization function. This voltage pulse is detected by the sensors on the bus and identifies the start of a new cycle for data transmission. This voltage pulse is known as the synchronization pulse and is formed with the aid of current sources and current sinks, which charge and discharge the bus load. This voltage pulse is typically repeated every 500 μs.

In order for a synchronous bus system having one sensor or multiple sensors to function, it is important for the synchronization pulse to have a certain shape and a certain time characteristic for all possible bus configurations under all possible operating conditions. Therefore, with conventional synchronous bus systems, a trapezoidal synchronization pulse $P_T$ having a predefined edge steepness, as illustrated in FIG. 3, is generally used. The edge steepness here lies between an edge steepness of a first characteristic curve, which represents a lower limit Vu, and an edge steepness of a second characteristic curve, which represents an upper limit Vo. During synchronous operation of the bus, the trapezoidal shape of synchronization pulse $P_T$ results in increased electromagnetic emission (EME) in the frequency spectrum of the signal transmission due to the high harmonic content. This may be counteracted to a certain extent by a synchronization pulse $P_{Tr}$ as illustrated in FIG. 4, for example, which has a trapezoidal shape having four rounded corners.

German Patent Application Publication No. DE 10 2009 001 370 A1 describes a reception device for receiving current signals, a circuit configuration having such a reception device and a method for transmitting current signals via a bus system. The reception device described there includes at least two bus connection devices for receiving current signals from multiple transmitters, each bus connection device being designed for connection to at least one bus connection, and a control device for outputting synchronization pulses to the bus connection devices for synchronization of the transmitters. The bus connection devices output the synchronization pulses to the multiple transmitters with at least one time offset relative to one another, the synchronization pulses each having a trapezoidal shape with rounded corners.

SUMMARY

An example receiver configuration according to the present invention for a control unit in a vehicle and an example method according to the present invention for generating a synchronization pulse may have the advantage that a preferably low electromagnetic emission is achievable, in particular in the spectral range of the signal transmission (100 kHz to 300 kHz) due to the sinusoidal formation of the synchronization pulse within the predefined limits.

In accordance with the present invention, not only the corners of the synchronization pulse are to be rounded but also the entire shape is to be optimized, in such a way that the electromagnetic emission remains limited preferably to the range of the fundamental waves of the synchronization pulse as much as possible.

Specific embodiments of the present invention provide a receiver configuration for a control unit in a vehicle having a voltage generator for generating a synchronization pulse, including a first voltage source, a current source and a current sink. The voltage generator generates the synchronization pulse within predefined specification limits having a predefined shape and a predefined time characteristic, and the receiver configuration outputs the synchronization pulse for synchronization of a signal transmission via a databus to at least one sensor. In accordance with the present invention, the voltage generator generates the synchronization pulse via the current source and the current sink by charging and/or discharging a bus load essentially as a sinusoidal oscillation. The current source here may supply current values which are greater than or equal to 0 mA, for example, and the current sink may supply voltage values less than 0 mA, for example.

Furthermore, an example method for generating a synchronization pulse for synchronization of a subsequent signal transmission between a receiver configuration and at least one sensor via a databus in a vehicle is provided. The synchronization pulse having a predefined shape and a predefined time characteristic is generated within predefined specification limits and is transmitted from the receiver configuration to the at least one sensor. In accordance with the present invention, the synchronization pulse is generated generally as a sinusoidal oscillation.

The synchronization pulse may preferably be transmitted from the receiver configuration to the at least one sensor before or at the start of the signal transmission between the at least one sensor and the receiver configuration.

It may be particularly advantageous if the voltage generator includes at least one digital trigger circuit and at least one digital/analog converter which generate and output an essentially sinusoidal reference current to the current source and the current sink.

In one advantageous embodiment of the receiver configuration according to the present invention, a first digital trigger circuit and a first digital/analog converter may generate and output a generally sinusoidal reference current to the current source. A second digital trigger circuit and a second digital/analog converter may also generate and output an generally sinusoidal reference current to the current source. This advantageously permits a very robust implementation of the synchronization pulse and a reduced electromagnetic emission. Furthermore, the triggering of the synchronization pulse may be shifted completely to the digital part of the circuit, which may result in an area-efficient approach per unit of area, due to the ever advancing scaling of the semiconductor technology. A voltage supply for the receiver may be decoupled from the databus during the synchronization pulse, while the voltage generator is activated for generating the synchronization pulse. Since the voltage generator includes a current source and a current sink for generating the synchronization pulse, the need for an additional switch in series with the current source and the current sink may be omitted.

In another advantageous embodiment of the receiver configuration according to the present invention, a joint digital trigger circuit and a joint digital/analog converter may generate and output a generally sinusoidal reference current to the current source and to the current sink. The number of components of the voltage generator may be reduced and layout area may be saved by joint utilization of the digital trigger circuit and the digital/analog converter.

The shape of the synchronization pulse may be stored either in the digital part or in the digital trigger circuit or it may be calculated with the aid of an algorithm. The digital/analog converter generates a reference current from an N-bit data word, this reference current being conducted via the current source and the current sink to the databus, charging and discharging the load applied to the databus. To generate a generally sinusoidal synchronization pulse, i.e., a sinusoidal or approximately sinusoidal synchronization pulse, both the current source and the current sink are triggered in a sinusoidal or approximately sinusoidal form. The resolution of the data word may be selected for emission reasons, in such a way that the synchronization pulse may be imaged without any significant discontinuities. The capacitance of the bus load integrates the bus current and thereby smoothes the voltage on the databus.

In another advantageous embodiment of the receiver configuration according to the present invention, the at least one digital trigger circuit may regulate the synchronization pulse based on the zero-signal current and the bus load, the zero-signal current regulation supplying a measure for the zero-signal current and a reached synchronization pulse amplitude supplying a measure for the bus load. The synchronization pulse amplitude may be ascertained by evaluation of the bus voltage. The information about the reached synchronization pulse amplitude is obtained by evaluating the bus voltage. Knowledge of zero-signal current is necessary to ensure a correct transfer of the zero-signal current by the current sources of the voltage generator at the start of the synchronization pulse. For evaluation of the bus voltage, a decision threshold is defined and monitored by a comparator, for example, within a defined time window. The at least one digital trigger circuit recognizes that the synchronization pulse amplitude is too high when the synchronization pulse has reached the decision threshold at a point in time before the time window. The at least one digital trigger circuit recognizes that the synchronization pulse amplitude is too low when the synchronization pulse has not reached the decision threshold during a period of the synchronization pulse. The at least one digital trigger circuit recognizes a correct synchronization pulse amplitude when the synchronization pulse has reached the decision threshold at a point in time within the time window. The evaluation of the synchronization pulse amplitudes may be carried out at any point in the synchronization pulse, for example, even along the ascending or descending edge. However, the lowest tolerances and thus the most reliable regulation are to be expected in the vicinity of the maximum of the pulse voltage since the voltage here is subject to the smallest changes. The duration of the synchronization pulse is kept constant while the step heights of the reference current output by the digital/analog converter may be scaled according to the information from the amplitude evaluation. The step height may be calculated, for example, by multiplying the minimum possible step height times a scaling factor. The minimum step height is obtained from the minimum current from the current source or the current sink. The scaling factor is increased when the synchronization pulse is too low and is reduced when the synchronization pulse is too high until the correct height is reached and the decision threshold is exceeded within the time window.

Exemplary embodiments of the present invention are shown in the figures and explained in greater detail below. In the figures, the same reference numerals denote components and elements, which carry out the same or similar functions.

DETAILED DESCRIPTION OF EXAMPLE EMBODIMENTS

Figure 1:
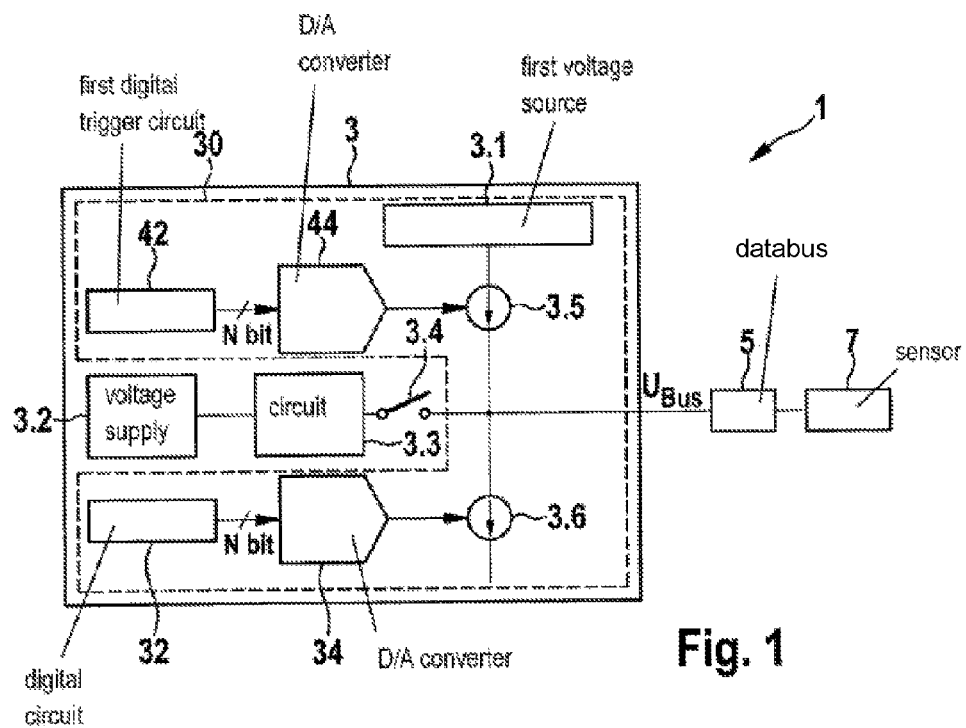
FIG. 1 shows a schematic block diagram of a sensor configuration having a first exemplary embodiment of a receiver configuration in accordance with the present invention for a control unit in a vehicle, which generates and outputs an optimized synchronization pulse.
Figure 2:
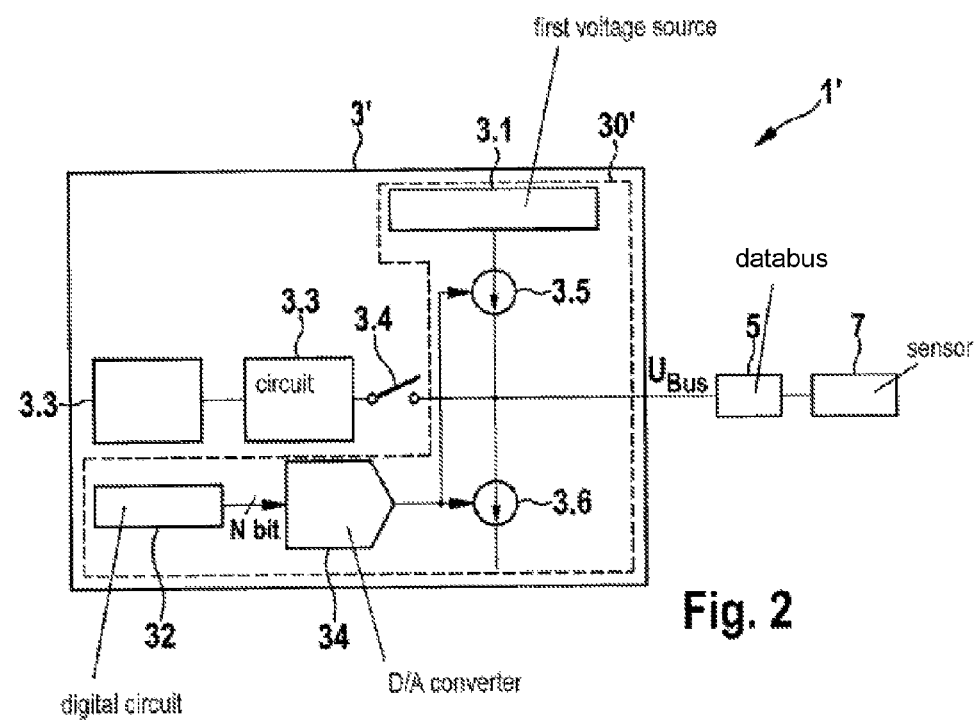
FIG. 2 shows a schematic block diagram of a sensor configuration having a second exemplary embodiment of a receiver configuration in accordance with the present invention for a control unit in a vehicle, which generates and outputs an optimized synchronization pulse.
Figure 3:
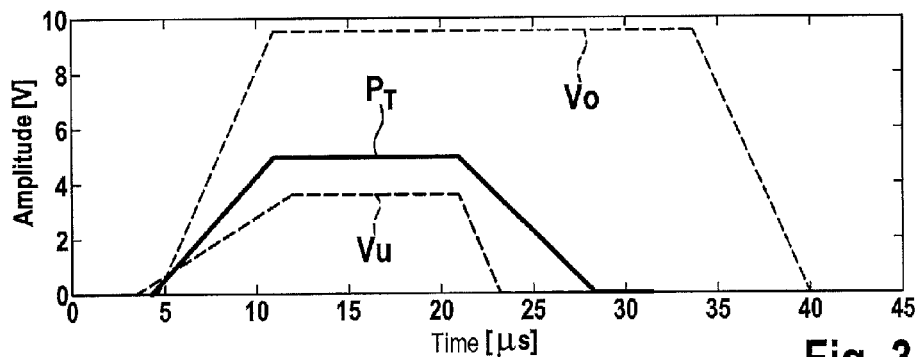
FIG. 3 shows a schematic diagram of the shape and time characteristic of a traditional trapezoidal synchronization pulse within predefined limits.
Figure 4:
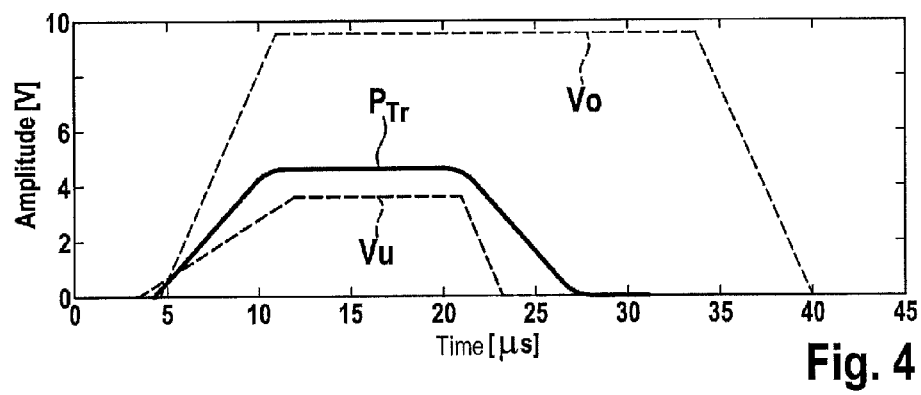
FIG. 4 shows a schematic diagram of the shape and the time characteristic of a traditional rounded trapezoidal synchronization pulse within the predefined limits.

As is shown in FIGS. 1 and 2, sensor configurations 1, 1' include a databus 5, at least one sensor 7 and one exemplary embodiment of a receiver configuration 3, 3' according to the present invention for a control unit in a vehicle. Receiver configurations 3, 3' according to the present invention each include a voltage generator 30, 30' for generating a synchronization pulse $P_{sync}$ having a first voltage source 3.1, a current source 3.5 and a current sink 3.6. According to the present invention, voltage generator 30, 30' generates a synchronization pulse $P_{sync}$ via current source 3.5 and current sink 3.6 by charging and/or discharging a bus load essentially as a sinusoidal oscillation.

Figure 5:
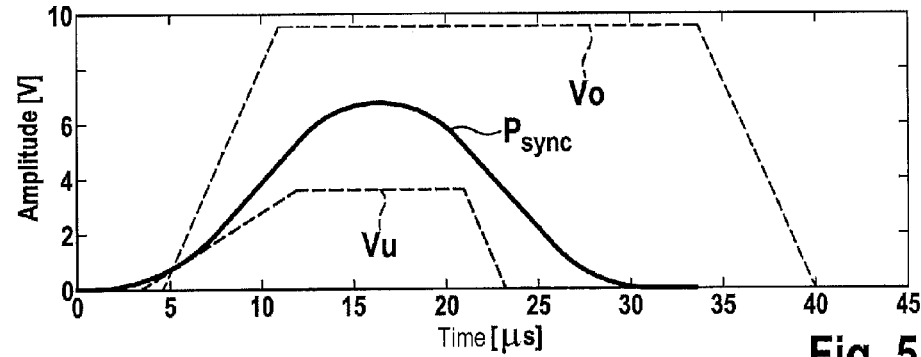
FIG. 5 shows a schematic diagram of the shape and the time characteristic of an optimized synchronization pulse in accordance with the present invention within the defined limits.

As is shown in FIG. 5, voltage generator 30, 30' generates a synchronization pulse $P_{sync}$ within predefined specification limits Vo, Vu having a predefined shape and predefined time characteristic. Receiver configuration 3, 3' outputs synchronization pulse $P_{sync}$ for synchronization of a subsequent signal transmission via a databus 5 to at least one sensor 7. In order for a synchronous bus system having one sensor 7 or multiple sensors to function, synchronization pulse $P_{sync}$ shown here has a certain shape and a certain time characteristic for all possible bus configurations under all possible operating conditions. As is also shown in FIG. 5, synchronization pulse $P_{sync}$ has an edge steepness predefined by the edge steepness of a first characteristic curve which represents lower limit Vu and the edge steepness of a second characteristic curve which represents upper limit Vo. Due to the sine shape or sinusoidal shape, synchronization pulse $P_{sync}$ is optimized within predefined limits Vu, Vo, in such a way that a preferably low electromagnetic emission is achievable, in particular in the spectral range of signal transmission (100 kHz to 300 kHz), which remains limited to the range of the fundamental waves of synchronization pulse $P_{sync}$.

As is also shown in FIGS. 1 and 2, voltage generator 30, 30' includes at least one digital trigger circuit 32, 42 and at least one digital/analog converter 34, 44, which generate and output an essentially sinusoidal reference current to current source 3.5 and current sink 3.6. The exemplary embodiments illustrated here permit a very robust implementation of synchronization pulse $P_{sync}$ and a reduced electromagnetic emission. The triggering of current source 3.5 and of current sink 3.6 for generating synchronization pulse $P_{sync}$ may also be shifted completely into the digital part of receiver configuration 3, 3', which results in an area-efficient approach due to the ever advancing scaling of the semiconductor technology.

As is also shown in FIGS. 1 and 2, a voltage supply 3.2 of remaining circuits 3.3 of receiver configuration 3, 3' is decoupled from databus 5 via a switching unit 3.4 during the generation and outputting of synchronization pulse $P_{sync}$, while voltage generator 30, 30' is activated to generate synchronization pulse $P_{sync}$. Since voltage generator 30, 30' includes current source 3.5 and current sink 3.6, there is no need for an additional switch in series with current source 3.5 and current sink 3.6.

As is also shown in FIG. 1, the first exemplary embodiment of receiver configuration 3 according to the present invention, as shown here, includes a first voltage generator 30, which has a first digital trigger circuit 42 and a first digital/analog converter 44, which generate and output an essentially sinusoidal reference current to current source 3.5 and a second digital trigger circuit 32 and a second digital/analog converter 34, which generate a generally sinusoidal reference current and output it to current sink 3.6.

As is also shown in FIG. 2, the second exemplary embodiment of receiver configuration 3' according to the present invention, as shown here, includes a second voltage generator 30', which includes a joint digital trigger circuit 32 and a joint digital/analog converter 34, which generate a generally sinusoidal reference current and output it to current source 3.5 and current sink 3.6. The number of components of voltage generator 30 from FIG. 1 may be reduced by joint use of digital trigger circuit 32 and digital/analog converter 34 for current source 3.5 and current sink 3.6. Voltage generator 30' from FIG. 1 thus uses less layout area or silicon area in comparison with voltage generator 30 from FIG. 1.

Figure 6:
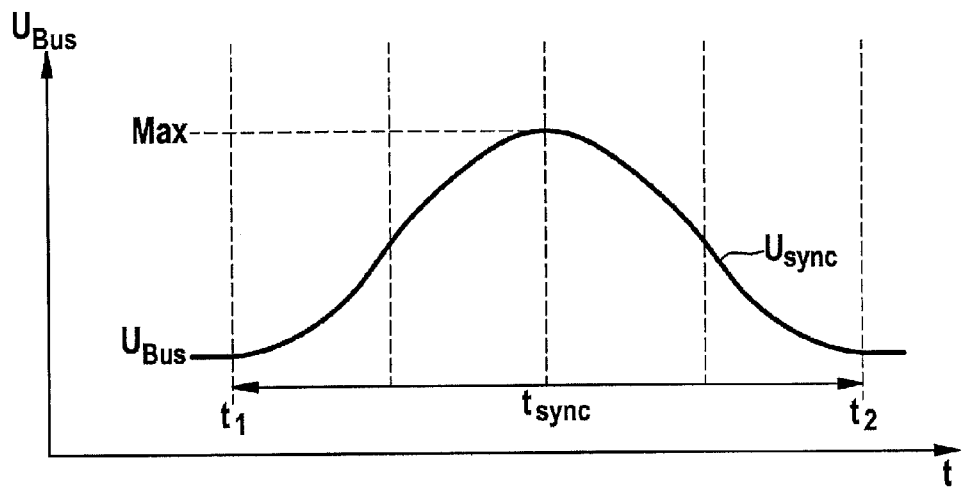
FIG. 6 shows a schematic diagram of the bus voltage during a synchronization pulse optimized in accordance with the present invention.
Figure 7:
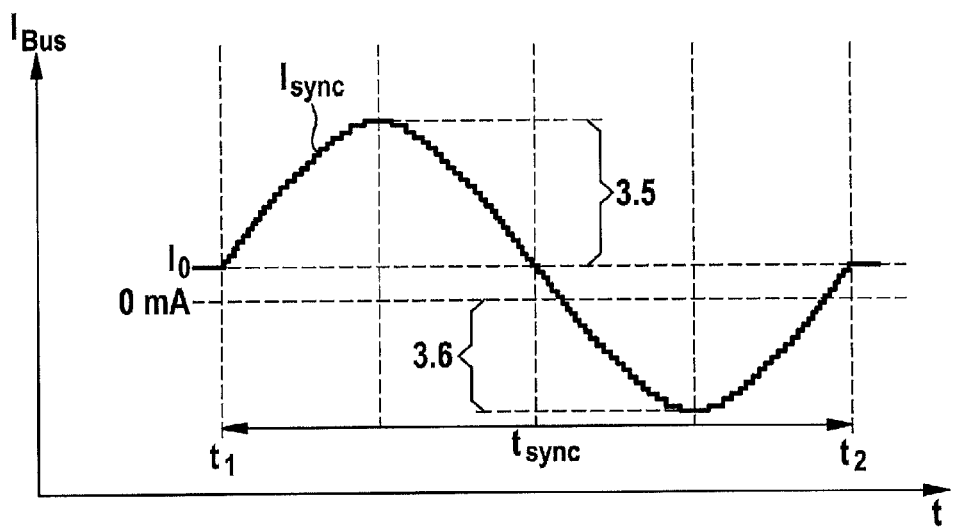
FIG. 7 shows a first schematic diagram of the bus current during a synchronization pulse optimized in accordance with the present invention.

The shape of synchronization pulse $P_{sync}$ is stored either in the digital part or in digital trigger circuit 32, 42 or is calculated with the aid of an algorithm in the digital part or in digital trigger circuit 32, 42. At least one digital/analog converter 34, 44 generates from the N-bit data word a reference current, which is conducted to the databus via current source 3.5 or current sink 3.6 and charges or discharges the load applied to the databus. To generate a sinusoidal or approximately sinusoidal synchronization pulse $P_{sync}$ from FIG. 5, both current source 3.5 and current sink 3.6 are triggered sinusoidally or approximately sinusoidally. FIGS. 6 and 7 outline the basic sequential control for generating a synchronization pulse $P_{sync}$. FIG. 6 shows a voltage pulse $U_{sync}$ and FIG. 7 shows a corresponding current pulse $I_{sync}$. At starting point $t_1$ of synchronization pulse $P_{sync}$, current source 3.5 supplies a zero-signal current $I_0$ from voltage supply 3.2 of receiver configuration 3, 3'. The information about zero-signal current $I_0$ is obtained by current source 3.5 from a zero-signal current re-adjustment known from the related art. At the first inflection point of voltage pulse $U_{sync}$, a greatest current $I_{sync}$ flows from current source 3.5, and only zero-signal current $I_0$ flows from current source 3.5 at maximum Max of voltage pulse $U_{sync}$. To implement the descending edge of synchronization pulse $P_{sync}$, current $I_{sync}$ is reduced by current source 3.5 after voltage maximum Max is reached until the current ultimately becomes zero and the current sink 3.6 starts a discharging process. At the second inflection point of voltage pulse $U_{sync}$, a greatest current $I_{sync}$ flows into current sink 3.6 and then declines again until current source 3.5 intervenes again, and in the last phase of synchronization pulse $P_{sync}$ supplies current $I_{sync}$ at final point in time $t_2$. Zero-signal current is in turn transferred from voltage supply 3.2 of receiver configuration 3, 3' at the final point in time $t_2$. Current source 3.5 thus supplies current values which are greater than or equal to 0 mA during the duration $t_{sync}$ of synchronization pulse $P_{sync}$, and current sink 3.6 supplies current values less than 0 mA.

The resolution of the data word is selected for emission reasons, in such a way that synchronization pulse $P_{sync}$ may be imaged without any significant discontinuities. The capacitance of the bus load integrates bus current $I_{Bus}$ and smoothes voltage $U_{BUS}$ on databus 5 in this way. The bus load may vary greatly as a function of the bus operation and necessitates a certain driver capability of current source 3.5 and current sink 3.6. This means that current source 3.5 and current sink 3.6 are capable of supplying and receiving a sufficiently high current to permit the desired shape of synchronization pulse $P_{sync}$ without any signal collapse or signal deformation. This driver capability is an important influencing parameter in the choice of an appropriate resolution of digital/analog converter 34, 44.

As is apparent from FIG. 5, requirements are made of the shape and edge steepness of synchronization pulse $P_{sync}$. On the one hand, the edge steepness must not be too low since this would result in higher tolerances in the recognition time of sensors 7. This in turn may limit the maximum number of sensors 7 and may thus reduce data throughput. On the other hand, the edge steepness must not be too high since this would result in increased electromagnetic emission. Two variables which greatly influence the behavior of synchronization pulse $P_{sync}$ include the bus load and zero-signal current $I_0$ of sensor 7 or of the sensors. Various bus and sensor configurations have greatly differing loads and zero-signal currents $I_0$. Bus current $I_{Bus}$ and bus voltage $U_{Bus}$ are regulated to nevertheless be able to represent a synchronization pulse $P_{sync}$ within predefined limits Vu, Vo despite these great variations in bus load and zero-signal current.

Figure 8:
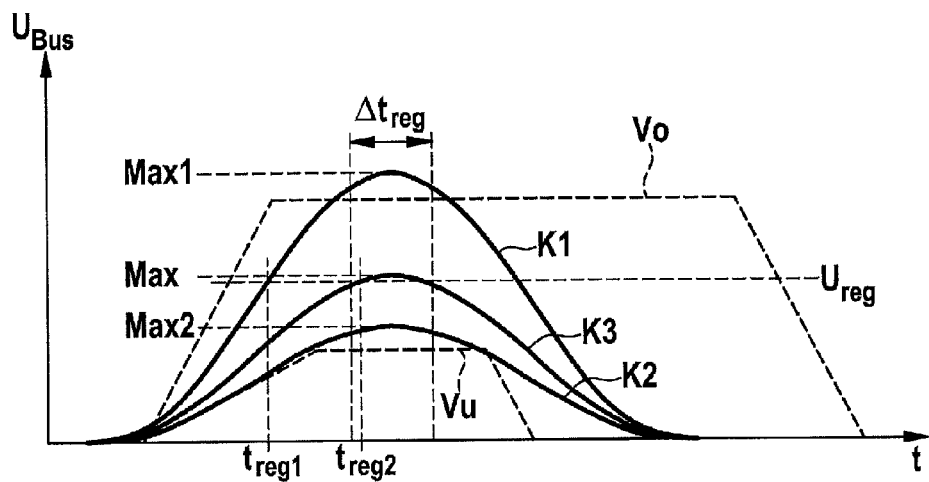
FIG. 8 shows a schematic diagram of the principle of regulation of the synchronization pulse amplitude using three synchronization pulses having different amplitudes, only the middle curve of which is within the specified limits.

Digital trigger circuit 32, 42 uses the information about zero-signal current $I_0$ from the re-adjustment of the zero-signal current and the information about achieved synchronization pulse amplitude Max to regulate synchronization pulse $P_{sync}$. Knowledge of zero-signal current $I_0$ is necessary to ensure correct transfer of zero-signal current $I_0$ by current source 3.5 of the voltage synchronization pulse generator at the start of synchronization pulse $P_{sync}$. Voltage generator 30, 30', which generates synchronization pulse $P_{sync}$ and includes at least one digital trigger circuit 32, 42, at least one digital/analog converter 34, 44, current source 3.5, current sink 3.6 and voltage supply 3.1 for current source 3.5 is identified as the synchronization pulse generator. Synchronization pulse amplitude Max is ascertained by the evaluation of bus voltage $U_{Bus}$. A decision threshold $U_{reg}$ and a time window $\Delta t_{reg}$ are defined for evaluation of bus voltage $U_{Bus}$. The at least one digital trigger circuit 32, 42 recognizes that synchronization pulse amplitude Max1 is too high when synchronization pulse $P_{sync}$ reaches decision threshold $U_{reg}$ at a point in time $t_{reg1}$ which is before time window $\Delta t_{reg}$. This state is represented by a first characteristic curve K1 in FIG. 8. The at least one digital trigger circuit 32, 42 recognizes that synchronization pulse amplitude Max2 is too low when synchronization pulse $P_{sync}$ does not reach decision threshold $U_{reg}$ during a period $t_{sync}$ of synchronization pulse $P_{sync}$. In FIG. 8 this state is represented by a second characteristic curve K2. The at least one digital trigger circuit 32, 42 recognizes a correct synchronization pulse amplitude Max when synchronization pulse $P_{sync}$ reaches decision threshold $U_{reg}$ at a point in time $t_{reg2}$, which is within time window $\Delta t_{reg}$. This state is represented in FIG. 8 by a third characteristic curve K3. Decision threshold $U_{reg}$ may be monitored by a comparator, for example. If decision threshold $U_{reg}$ is exceeded too early, i.e., before monitoring window $\Delta t_{reg}$, generated synchronization pulse $P_{sync}$ would then be too high. If decision threshold $U_{reg}$ is never exceeded, then generated synchronization pulse $P_{sync}$ would be too low. Only when decision threshold $U_{reg}$ has been exceeded in monitored time window $\Delta t_{reg}$ is there a synchronization pulse $P_{sync}$ of the correct height. In principle, the synchronization pulse amplitude may be evaluated at any point in synchronization pulse $P_{sync}$, for example, even along the rising or falling edges. However, even the slightest tolerances and thus the most reliable regulation are to be expected in the vicinity of the maximum of pulse voltage $U_{sync}$ since the voltage here is subject to the least changes.

Figure 9:
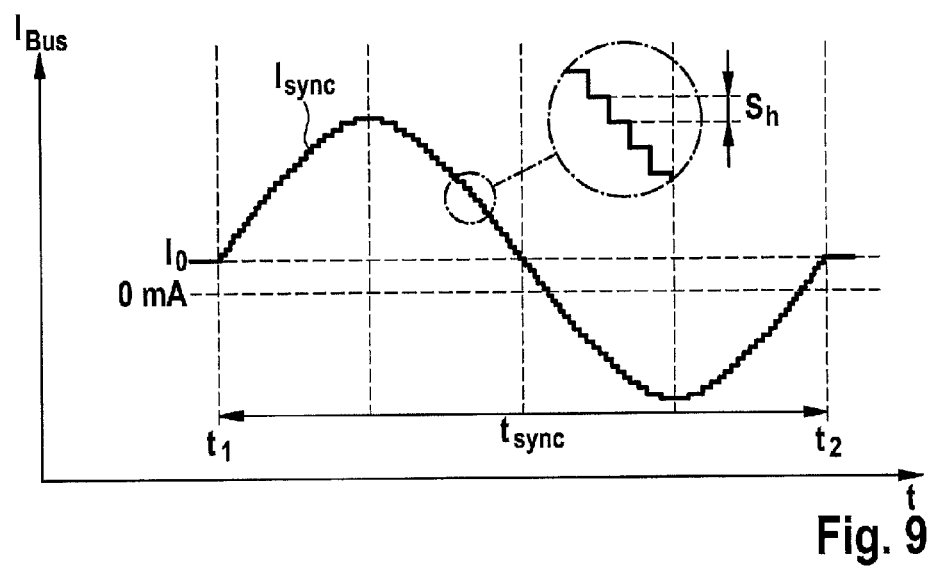
FIG. 9 shows a second schematic diagram of the bus current during a synchronization pulse optimized in accordance with the present invention.

As is shown in FIG. 9, the duration of synchronization pulse $t_{sync}$ is kept constant while step height $S_h$ of output current pulse $I_{sync}$, based on the at least one digital/analog converter 34, 44, may be scaled according to the information from the amplitude evaluation. Step height $S_h$ is calculated by multiplying the minimum possible step height times a scaling factor. The minimum step height is obtained from the minimum outputtable current value of current source 3.5 and of current sink 3.6. The scaling factor is increased when synchronization pulse $P_{sync}$ is too low and is decreased when synchronization pulse $P_{sync}$ is too high until the correct height is reached, and decision threshold $U_{reg}$ is exceeded within time window $\Delta t_{reg}$.

Specific embodiments of the method according to the present invention for generating a synchronization pulse $P_{sync}$ for synchronization of a subsequent signal transmission between receiver configuration 3, 3' and at least one sensor 7 via a databus 5 in a vehicle generate synchronization pulse $P_{sync}$ within predefined specification limits Vo, Vu having a predefined shape and a predefined time behavior. Synchronization pulse $P_{sync}$ is transmitted from receiver configuration 3, 3' to the at least one sensor 7 at the start of the signal transmission between the at least one sensor 7 and receiver configuration 3, 3'. In accordance with the present invention, synchronization pulse $P_{sync}$ is generated generally as a sinusoidal oscillation.

What is claimed is:

1. A receiver configuration for a control unit in a vehicle, the receiver configuration including a voltage generator to generate a synchronization pulse which includes a first voltage source, a current source and a current sink, the voltage generator to generate the synchronization pulse within predefined specification limits having a predefined shape and a predefined time behavior, and the receiver configuration configured to output the synchronization pulse for synchronization of a signal transmission via a databus to at least one sensor, wherein the voltage generator is configured to generate the synchronization pulse via the current source and the current sink by at least one of charging and discharging a bus load as a sinusoidal oscillation so that the synchronization pulse includes a form substantially of a complete continuous sine wave.

2. The receiver configuration as recited in claim 1, wherein:
   the voltage generator includes at least one digital/analog converter and at least one digital trigger circuit that provides a digital output to the at least one digital/analog converter;
   the at least one digital/analog converter produces a reference current corresponding to the digital output of the at least one digital trigger circuit;
   the at least one digital/analog converter provides the reference current to each of the current source and the current sink;
   the current source and current sink perform a sequence of charging and a discharging of the bus load, which is applied to the databus, using a voltage of the voltage source and according to the provided reference current; and
   the sine wave form of the synchronization pulse is a product of the sequence of the charging and the discharging.

3. The receiver configuration as recited in claim 1, wherein the form includes four consecutive and different sine wave quadrants.

4. The receiver configuration as recited in claim 1, wherein the form includes a first region beginning from a first sine wave trough to a sine wave crest, immediately inflecting into a second region that extends from the sine wave crest to a second sine wave trough.

5. A receiver configuration for a control unit in a vehicle, the receiver configuration including a voltage generator to generate a synchronization pulse which includes a first voltage source, a current source and a current sink, the voltage generator to generate the synchronization pulse within predefined specification limits having a predefined shape and a predefined time behavior, and the receiver configuration configured to output the synchronization pulse for synchronization of a signal transmission via a databus to at least one sensor, wherein:
   the voltage generator is configured to generate the synchronization pulse via the current source and the current sink by at least one of charging and discharging a bus load as a sinusoidal oscillation; and
   the voltage generator includes at least one digital trigger circuit and at least one digital/analog converter which generate a sinusoidal reference current and output the generated sinusoidal reference current to each of the current source and the current sink in parallel.

6. The receiver configuration as recited in claim 5, wherein a first digital trigger circuit and a first digital/analog converter generate a sinusoidal reference current and output same to the current source.

7. The receiver configuration as recited in claim 5, wherein a joint digital trigger circuit and a joint digital/analog converter generate a sinusoidal reference current and output same to the current source and the current sink.

8. The receiver configuration as recited in claim 7, wherein the current source supplies current values which are greater than or equal to 0 mA, the current sink supplies current values less than 0 mA.

9. The receiver configuration as recited in claim 5, wherein:
   the at least one digital trigger circuit at least one of (1) stores the predefined shape and the predefined time behavior of the synchronization pulse and (2) calculates the predefined shape and the predefined time behavior of the synchronization pulse; and
   the at least one digital trigger circuit is configured to output to the at least one digital/analog converter digital data words that correspond to the predefined shape and predefined time behavior of the synchronization pulse.

10. A receiver configuration for a control unit in a vehicle, the receiver configuration including a voltage generator to generate a synchronization pulse which includes a first voltage source, a current source and a current sink, the voltage generator to generate the synchronization pulse within predefined specification limits having a predefined shape and a predefined time behavior, and the receiver configuration configured to output the synchronization pulse for synchronization of a signal transmission via a databus to at least one sensor, wherein:
   the voltage generator is configured to generate the synchronization pulse via the current source and the current sink by at least one of charging and discharging a bus load as a sinusoidal oscillation; and
   the voltage generator includes:
      a first digital trigger circuit and a first digital/analog converter configured to generate, and output to the current source, a sinusoidal reference current; and
      a second digital trigger circuit and a second digital/analog converter configured to generate, and output to the current sink, a sinusoidal reference current.

11. A receiver configuration for a control unit in a vehicle, the receiver configuration including a voltage generator to generate a synchronization pulse which includes a first voltage source, a current source and a current sink, the voltage generator to generate the synchronization pulse within predefined specification limits having a predefined shape and a predefined time behavior, and the receiver configuration configured to output the synchronization pulse for synchronization of a signal transmission via a databus to at least one sensor, wherein:
   the voltage generator is configured to generate the synchronization pulse via the current source and the current sink by at least one of charging and discharging a bus load as a sinusoidal oscillation;
   the voltage generator includes at least one digital trigger circuit and at least one digital/analog converter configured to generate, and output to the current source and the current sink, a sinusoidal reference current; and
   the at least one digital trigger circuit regulates the synchronization pulse based on a zero-signal current and the bus load, a zero-signal current regulation supplying a measure for the zero-signal current and an achieved synchronization pulse amplitude supplying a measure for the bus load, the synchronization pulse amplitude being ascertainable by evaluation of the bus voltage.

12. The receiver configuration as recited in claim 11, wherein for evaluation of the bus voltage, a decision threshold and a time window are defined, the at least one digital trigger circuit configured to recognize that the synchronization pulse amplitude is too high when the synchronization pulse reaches the decision threshold at a point in time before the time window, the at least one digital trigger circuit configured to recognize that the synchronization pulse amplitude is too low when the synchronization pulse has not reached the decision threshold during a period of the synchronization pulse, and the at least one digital trigger circuit configured to recognize a correct synchronization pulse amplitude when the synchronization pulse has reached the decision threshold at a point in time within the time window.

13. A method for generating a synchronization pulse for synchronization of a subsequent signal transmission between a receiver configuration and at least one sensor via a databus in a vehicle, comprising:
   generating the synchronization pulse within predefined specification limits and to have a predefined shape and a predefined time behavior; and
   transmitting the synchronization pulse by the receiver configuration to the at least one sensor;
   wherein the synchronization pulse is generated as a sinusoidal oscillation including substantially a complete continuous sine wave.

\* \* \* \* \*